(12) United States Patent
Vanags

(10) Patent No.: US 9,417,850 B2
(45) Date of Patent: Aug. 16, 2016

(54) GRACE~OPERATOR FOR CHANGING ORDER AND SCOPE OF IMPLICIT PARAMETERS

(71) Applicant: Logics Research Centre SIA, Riga (LV)

(72) Inventor: Mikus Vanags, Riga (LV)

(73) Assignee: Logics Research Centre, Riga (LV)

( * ) Notice: Subject to any disclaimer, the term of this patent is extended or adjusted under 35 U.S.C. 154(b) by 0 days.

(21) Appl. No.: 14/594,113

(22) Filed: Jan. 10, 2015

(65) Prior Publication Data

US 2016/0202955 A1 Jul. 14, 2016

(51) Int. Cl.
*G06F 9/44* (2006.01)
*G06F 9/45* (2006.01)
*G06F 9/445* (2006.01)

(52) U.S. Cl.
CPC *G06F 8/20* (2013.01); *G06F 8/456* (2013.01); *G06F 8/74* (2013.01); *G06F 8/443* (2013.01); *G06F 9/4425* (2013.01)

(58) Field of Classification Search
CPC ............. G06F 9/4425; G06F 9/30174; G06F 9/30189; G06F 9/3861; G06F 8/443; G06F 8/72; G06F 8/427; G06F 8/33; G06F 8/51; G06F 8/74; G06F 8/456; G06F 7/41; G06F 7/427; G06F 7/423
See application file for complete search history.

(56) References Cited

U.S. PATENT DOCUMENTS

| | | | | |
|---|---|---|---|---|
| 5,742,738 A * | 4/1998 | Koza | ....................... | G06N 3/126 706/13 |
| 6,026,233 A * | 2/2000 | Shulman | .................... | G06F 8/33 715/201 |
| 7,299,461 B2 * | 11/2007 | Boehm | .................... | G06F 8/423 717/143 |
| 7,356,812 B2 * | 4/2008 | Herschleb | ............... | G06F 8/443 717/159 |
| 7,673,289 B1 * | 3/2010 | Johnson | ................ | G06F 9/4425 717/126 |
| 7,856,624 B2 * | 12/2010 | Plum | ........................ | G06F 8/41 717/106 |
| 2004/0031024 A1 * | 2/2004 | Fairweather | ............ | G06F 8/427 717/143 |
| 2007/0055966 A1 * | 3/2007 | Waddington | ............. | G06F 8/72 717/144 |
| 2007/0142929 A1 * | 6/2007 | Pereira | ...................... | G06F 8/41 700/12 |
| 2010/0275189 A1 * | 10/2010 | Cooke | ..................... | G06F 8/456 717/146 |
| 2011/0283258 A1 * | 11/2011 | Yaung | ...................... | G06F 8/72 717/113 |
| 2012/0030655 A1 * | 2/2012 | de Castillo | ............... | G06F 8/51 717/125 |

(Continued)

OTHER PUBLICATIONS

Gabriel Dos Reis et al., Specifying C++ Concepts, Jan. 2006, [Retrieved on Nov. 9, 2015]. Retrieved from the internet: <URL: http://dl.acm.org/citation.cfm?id=1111064> 14 Pages (295-308).*

(Continued)

*Primary Examiner* — Thuy Dao
*Assistant Examiner* — Anibal Rivera

(57) ABSTRACT

Implicit parameters and implicit arguments are useful in many programming paradigms including functional and logic programming. Implicit parameter declaration order is inferred from the subroutine parameter usage order in the subroutine body. It means that implicit parameters have limited possibilities to be declared in the same order as programmers want. The parameter ignorance operator # allows changing implicit parameter order, but usage of this operator leads to subroutine declaration syntax similar to the syntax of declaring subroutine parameters explicitly, partially losing syntax benefits gained of implicit parameters. In order to preserve all the benefits of implicit parameter usage and allow programmers to change implicit parameter declaration order and scope in concise way, the Grace~ operator, which is presented in this document, was invented.

8 Claims, 6 Drawing Sheets

(56) References Cited

U.S. PATENT DOCUMENTS

2013/0254743 A1* 9/2013 Howard .................. G06F 8/74
717/123
2015/0143330 A1 5/2015 Vanags

OTHER PUBLICATIONS

Raghavan Komondoor et al., Using Slicing to Identify Duplication in Source Code, 2001, [Retrieved on May 17, 2016]. Retrieved from the internet: <URL: http://download.springer.com/static/pdf> 17 Pages (40-56).*

Gabe Rudy et al., A Programming Language Interface to Describe Transformations and Code Generation, 2011, [Retrieved on May 17, 2016]. Retrieved from the internet: <URL: http://download.springer.com/static/pdf> 15 Pages (136-150).*

Stansifer R. The Study of Programming Languages. Prentice Hall, New Jersey, USA. 1994.

Vanags M., Justs J., Tumpelis J., Implicit lambda calculus. Logics Research Centre, Publication service, 2014.

* cited by examiner

FIG. 1 -Prior Art-

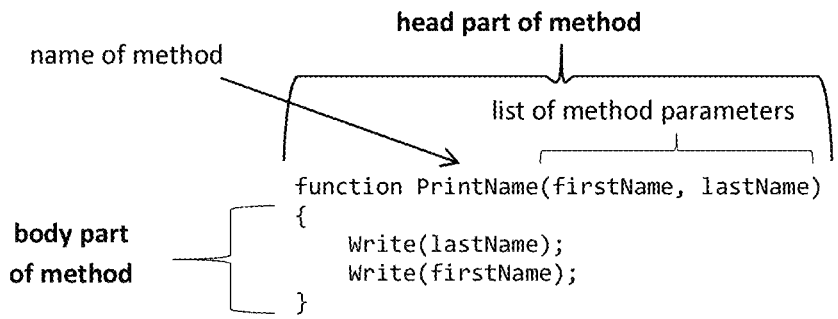

```
function PrintName(firstName, lastName)
{
    Write(lastName);
    Write(firstName);
}
```

FIG. 2 -Prior Art-

```
function BuggyPrintName()
{
    Write(lastName);
    Write(firstName);
}
```

FIG. 3 -Prior Art-

```
function BuggyPrintName(lastName, firstName)
{
    Write(lastName);
    Write(firstName);
}
```

FIG. 4 -Prior Art-

```
function DoNothingWith(params) { }
function PrintName()
{
    DoNothingWith(firstName);
    Write(lastName);
    Write(firstName);
}
```

FIG. 5 -Prior Art-

```
function PrintName()
{
    #firstName;
    Write(lastName);
    Write(firstName);
}
```

FIG. 6

```
function PrintName()
{
    Write(lastName);
    Write(~firstName);
}
```

FIG. 7

```
function PrintName()
{
    Write(lastName~);
    Write(firstName);
}
```

FIG. 8 -Prior Art-

```
function GetValue(a, b, c)
{
    return c - b + a;
}
```

FIG. 9

```
function GetValue()
{
    return c~~ - b + ~a;
}
```

FIG. 10

```
function GetValue()
{
    return c~ - b + ~~a;
}
```

FIG. 11

```
function GetValue()
{
    return c~~~ - ~b~ + ~a;
}
```

FIG. 12

```
function SumOfParams()
{
    return a~~ + b~;
}
```

FIG. 13 -Prior Art-

```
function SumOfParams(b, a)
{
    return a + b;
}
```

```
function CalculateSomething()
{
    return b + c + 2~a;
}
```

FIG. 15 -Prior Art-

```
function CalculateSomething(a, b, c)
{
    return b + c + a;
}
```

```
function CalculateSomething(???)
{
    return b + (c + 2)~a; // '(c+2)' is expected to be constant for Grace~ to be correct
}
```

FIG. 18 -Prior Art-

```
function GlobalFunction(x)
{
    function LocalFunction(y)
    {
        return x + y;
    }
    return LocalFunction;
}
```

FIG. 19 -Prior Art-

```
function GlobalFunction(x)
{
    return function (y)
    {
        return x + y;
    }
}
```

FIG. 20 -Prior Art-

```
function WrongFunction()
{
    return function()
    {
        return x + y;
    }
}
```

FIG. 21 -Prior Art-

```
function WrongFunction()
{
    return function(x, y)
    {
        return x + y;
    }
}
```

FIG. 22

```
function GlobalFunction()
{
    return function()
    {
        return ~x + y;
    }
}
```

FIG. 23

```
function GlobalFunction()
{
    return ~x + y;
}
```

FIG. 24

```
function TooMuchParamMovement()
{
    return ~~x + 6;
}
```

FIG. 25 -Prior Art-

```
function TooMuchParamMovement(x)
{
    return function () //redundant scope (excluding nested scope) should be removed
    {
        return function () //nested non-redundant scope should not be removed
        {
            return x + 6;
        }
    }
}
```

FIG. 26 -Prior Art-

```
function TooMuchParamMovement(x)
{
    return function ()
    {
        return x + 6;
    }
}
```

GRACE-OPERATOR FOR CHANGING ORDER AND SCOPE OF IMPLICIT PARAMETERS

REFERENCES CITED

U.S. Patent Documents

1. M. Vanags, J. Justs, D. Romanovskis, Implicit parameters and implicit arguments in programming languages, U.S. patent application Ser. No. 14/081,460, filling date: November, 2013.

Other Sources

2. Ryan D. Stansifer. (1994). The study of programming languages. Prentice-Hall, Inc. New Jersey, USA.
3. Vanags M., Justs J., Tumpelis J., Implicit lambda calculus. Logics Research Centre, Publication service, 2014.

BRIEF DESCRIPTION OF DRAWINGS

The methods for changing order and scope of implicit parameters in subroutine declaration are further described with reference to the accompanying drawings in which:

FIG. 1 show pseudo code example of method (subroutine) named 'PrintName' using explicit parameters.

FIG. 2 show pseudo code example of method (subroutine) named 'BuggyPrintName' using implicit parameters.

FIG. 3 show pseudo code example of method (subroutine) named 'BuggyPrintName' using explicit parameters.

FIG. 4 show pseudo code example of method (subroutine) named 'DoNothingWith' together with its calling code—method 'PrintName'. Method 'DoNothingWith' call is used to change order of implicit parameters defined in method 'PrintName' body.

FIG. 5 show pseudo code example of method (subroutine) named 'PrintName' using implicit parameters and parameter order correction operator '#'.

FIG. 6 show pseudo code example of method (subroutine) named 'PrintName' using implicit parameters and prefix form of parameter order correction operator 'Grace~'.

FIG. 7 show pseudo code example of method (subroutine) named 'PrintName' using implicit parameters and postfix form of parameter order correction operator 'Grace~'.

FIG. 8 show pseudo code example of method (subroutine) named 'GetValue' using explicit parameters.

FIG. 9 show pseudo code example of method (subroutine) named 'GetValue' using implicit parameters parameter order correction operator 'Grace~'.

FIG. 10 show another pseudo code example of method (subroutine) named 'GetValue' using implicit parameters and parameter order correction operator 'Grace~'.

FIG. 11 show pseudo code example of method (subroutine) named 'GetValue' using implicit parameters and parameter order correction operator 'Grace~' which is used excessively.

FIG. 12 show pseudo code example of method (subroutine) named 'SumOfParams' using implicit parameters and parameter order correction operator 'Grace~'.

FIG. 13 show pseudo code example of method (subroutine) named 'SumOfParams' using explicit parameters.

FIG. 15 show pseudo code example of method (subroutine) named 'CalculateSomething' using explicit parameters.

FIG. 18 show declaration of example method (subroutine) named 'GlobalFunction' using nested named function 'LocalFunction'. In example are used explicit parameters.

FIG. 19 show declaration of example method (subroutine) named 'GlobalFunction' using nested anonymous function. In example are used explicit parameters.

FIG. 20 show declaration of example method (subroutine) named 'WrongFunction' using nested anonymous function. In example are used implicit parameters.

FIG. 21 show declaration of example method (subroutine) named 'WrongFunction' using nested anonymous function. In example are used explicit parameters.

FIG. 22 show declaration of example method (subroutine) named 'GlobalFunction' using nested anonymous function. In example are used implicit parameters and operator Grace~ is applied to parameter×changing parameter×scope to more global scope.

FIG. 23 show declaration of example method (subroutine) named 'GlobalFunction'. In example are used implicit parameters and operator Grace~ is applied to parameter 'x' creating new anonymous method scope to wrap algorithm defined in the body of the 'GlobalFunction'.

FIG. 24 show declaration of example method (subroutine) named 'TooMuchParamMovement'. In example is used implicit parameter 'x' and operator Grace~ is applied to parameter 'x' creating two additional anonymous method scopes to wrap algorithm defined in the body of the function 'TooMuchParamMovement'.

FIG. 25 show declaration of example method (subroutine) named 'TooMuchParamMovement'. In example is used explicit parameter 'x' and second order nested anonymous function to wrap algorithm defined in the body of the function 'TooMuchParamMovement'.

FIG. 26 show declaration of example method (subroutine) named 'TooMuchParamMovement'. In example is used explicit parameter 'x' and example contains no redundant anonymous function scopes.

BACKGROUND

1. Field of Invention

Figures 14, 16, 17:
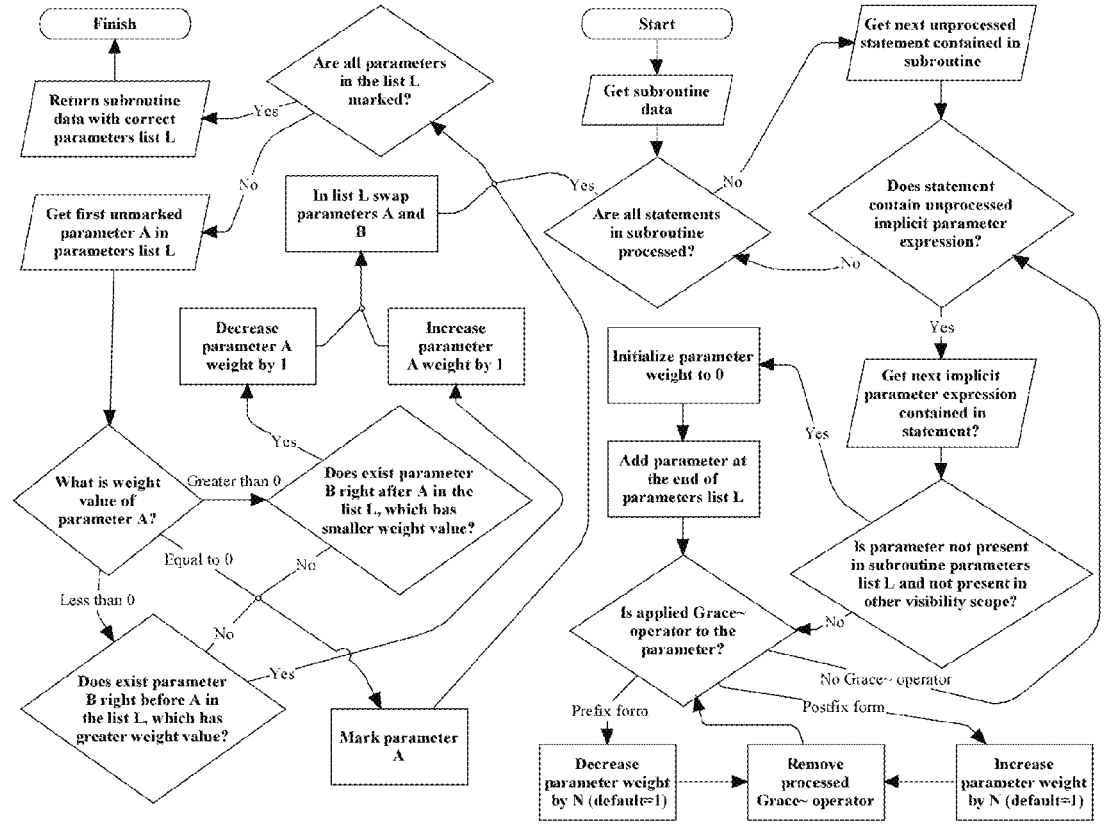
FIG. 14 show pseudo code example of method (subroutine) named 'CalculateSomething' using implicit parameters and prefix form of parameter order correction operator 'Grace~' accepting argument N which determines how many times to perform single movement operation of the parameter in the list of method parameters.
FIG. 16 show pseudo code example of method (subroutine) named 'CalculateSomething' using implicit parameters and wrong usage of prefix form of parameter order correction operator 'Grace~'.
FIG. 17. show flowchart diagram demonstrating the logics of Grace~ operator in subroutines of simple scope.

The invention relates to computer programming language design, more specifically: improvement of subroutine (function, method, constructor, lambda expression . . . ) declaration raising code readability and code editability factors.

2. Related Art

In computer programming, a parameter (formal parameter) is a special kind of variable, used in a subroutine to refer to one of the pieces of data provided as input to the subroutine. These pieces of data are arguments (actual parameters). For the most part programming languages use a positional correspondence between parameters and arguments [2].

Just as in standard mathematical usage, the argument is thus the actual input passed to a function, procedure, or routine, whereas the parameter is the variable inside the implementation of the subroutine.

Pseudo code example of method declaration containing two explicitly defined parameters is shown in FIG. 1.

Implicit parameters mean taking formal parameters declaration of the method from the method head part to the method body part, where each implicit parameter will be declared as an expression. [1, 3]

Respectively: method (subroutine) implicit parameters are declared in the method body part as expressions. In pseudo code this can be expressed as shown in FIG. 2.

When using implicit parameters, every undefined identifier used in the method body should be interpreted as implicit parameter of the method. Therefore, in the code fragment defined in FIG. 2, 'lastName' and 'firstName' are implicit parameters being method parameters by definition.

Code fragment shown in FIG. 2 is equivalent to the pseudo code fragment using explicitly defined method parameters shown in FIG. 3.

The problem is that implicit parameter order in the list of method parameters depends on the order how the parameters are used in the method body. Sometimes it is not preferred order by the programmers. To define function 'PrintName' using implicit parameters, special functionality, which could control order of implicit parameters in the list of method parameters, is necessary.

Implicit parameter order in the list of method parameters can be changed by using any statement, for example, method 'DoNothingWith', which accepts parameter but does not lead to any action as shown in FIG. 4.

This way it is possible to make method 'PrintName' to accept two parameters so, that the first is 'firstName' and the second—'lastName' and the printing algorithm remains unchanged. However, the problem is that the method 'DoNothingWith' is useless from a business logic perspective and in optimization phase (performed by compiler) it should be removed from the program. More practical approach would be to create special parameter order correction operator '#' which would act like method 'DoNothingWith'. The operator '#' allows placing implicit parameters into the list of method (where the operator '#' is used in the body) parameters without adding extra functional program logic to the abstract syntax tree. The main benefit of the operator '#' is that it can be a standardized, predefined way to define parameters in one order and process them in different order without adding extra program logic information to the abstract syntax tree. This way it is possible to process operator '#' in parsing phase by reducing the need for it to be optimized in the optimization phase [1, 3].

Operator '#' is used as a statement in the following syntactic form:

listOfParameters;

Where 'listOfParameters' is non-empty list containing implicit parameters separated by comma. Method 'PrintName' can be improved by using operator '#' as shown in FIG. 5.

So far everything is fine, except the fact that the syntax starts to look similar as it was at the beginning, when explicit parameters were used—method declaration starts with listing of method parameters to be put into the list of method parameters.

SUMMARY

Implicit parameters and implicit arguments are useful in programming languages supporting subroutines which can accept parameters. Examples of such subroutines are: methods, procedures, functions, constructors, lambda expressions and other structures.

Implicit parameter declaration order is inferred from the method parameter usage order in the method body. It means that implicit parameters without using any parameter order correction operator have limited possibilities to be declared in the same order as programmers would like to.

Current invention provides methods for changing order and scope of implicit parameters. The innovation is based on introduction of various prefix and postfix forms of implicit parameter order correction operator Grace~. Operator Grace~ can be used to change scope of implicit parameters.

Introduced operator require changes in programming languages, but as result can raise readability and editability of different subroutine types, for example: lambda expressions (anonymous nested functions or procedures).

DETAILED DESCRIPTION

Operator '#' places implicit parameters in the list of method parameters and operator '#' usage is sequential—new parameters cannot be placed in the list of method parameters in other position than at the end of method parameters list. Situation can be changed by inventing operator Grace~ (inspired by Grace Juang) which allows correcting order of implicit parameters in a non-sequential way. The author's preferred written form of Grace~ operator in natural languages is the following: 'Grace~' instead of '~'.

Syntax of operator Grace~ is the following:

1) Prefix form (operator Grace~ is placed immediately before implicit parameter usage):

~parameter

Prefix form of Grace~ operator moves parameter one position towards first position in the list of method parameters. Example is shown in FIG. 6 where parameter 'firstName' position is swapped with parameter 'lastName' position in the list of method parameters.

2) Postfix form (operator Grace~ is placed immediately after implicit parameter usage):

parameter~

Postfix form of Grace~ operator moves parameter by one position towards the last position in the list of method parameters. Example is shown in FIG. 7 where parameter 'lastName' position is swapped with parameter 'firstName' position in the list of method parameters.

Operator Grace~ does not affect algorithm defined in the method body, it affects only parameter order in the list of method parameters.

One usage of Grace~ operator forces compiler is to swap the necessary parameter with previous parameter (in case of prefix Grace~ operator form) or with next parameter (in case of postfix Grace~ operator form) in the list of the method parameters. It means that using Grace~ operator twice will result in moving parameter by two positions in the method parameters list.

In FIG. 8 is shown pseudo code for function 'GetValue' definition by using explicit parameters. Using implicit parameters in combination with Grace~ operator it is possible to define function 'GetValue' as shown in FIG. 9. There are many ways how to reach the same effect. One more example of defining function 'GetValue' is shown in FIG. 10. Pseudo code example demonstrating excessive usage of Grace~ operator is shown in FIG. 11. This example can be split into subexpressions:

1) c~~ moves parameter 'c' by two positions towards the last position of the method parameters list reaching last position and third usage of operator Grace~ is ignored. After this operation the list of method parameters will be the following: [b, a, c];

2) ~b~ does not affect position of parameter 'b' in the list of the method parameters
3) ~a moves parameter one position towards the first position of the method parameters list exchanging 'a' with 'b'. Consequently the list of method parameters will be the following: [a, b, c].

Multiple usages of the operator Grace~ are summed up and operator usage is ignored only if no more changes are possible in the method parameter order.

Consider pseudo code example of method 'SumOfParams' demonstrated in FIG. 12. With the first usage of operator Grace~ parameter 'a' is moved to the last position in the method parameter list. Second usage of Grace~ operator does not move parameter 'a' outside of the method parameter list, but this time the usage of Grace~ operator is not ignored. Expression 'b~' contains one more Grace~ operator which neutralizes one usage of the Grace~ operator applied to the parameter 'a'. Therefore parameter 'b' is not moved one position towards the last position in the method parameter list. Implicit parameter usage example shown in FIG. 12 is equivalent to the example using explicit parameters shown in FIG. 13.

To simplify multiple usage of operator Grace~, the following two additional syntactic forms can be used:
1) Prefix form:
N~parameter
2) Postfix form:
parameter~N Where N is constant determining how many times parameter should be moved towards the first or last position of the method parameter list.

As Grace~ operator does not affect the algorithm defined in the method body, priority of Grace~ operator should be higher than the priority of any other operator used in the method body. Therefore it is necessary not to affect the algorithm defined in the method body. This means, that pseudo code example using implicit parameters shown in FIG. 14 should be interpreted as pseudo code example using explicit parameters as demonstrated in FIG. 15, instead of invalid code interpretation shown in FIG. 16.

Diagram demonstrating the logics of Grace~ operator in simple subroutine scope environments is shown in FIG. 17. Programming language parser should contain this logic to parse subroutines with implicit parameters correctly.

It is clear, that parameter cannot be moved outside the list of method parameters if the parameter is moved towards the last position of that list. But in case of nested functions, it makes sense for a parameter to be moved outside of the list of method parameters if the parameter is moved towards the first position of that list.

Some programming languages support nested function (subroutine) declarations, when one function is declared inside another. This idea is illustrated in pseudo code example shown in FIG. 18, where nested function is named function. But nested function also can be anonymous function declaration (in some programming languages anonymous functions are called lambda expressions). Pseudo code example of lambda expression is demonstrated in FIG. 19.

Using implicit parameters without any parameter order correction operator it is impossible to define function 'GlobalFunction' like shown in example of FIG. 19, because implicit parameters are interpreted to belong to scope of nearest function where they are used for the first time. Pseudo code example of function 'WrongFunction' using implicit parameters is demonstrated in FIG. 20 where is tried to define function 'GlobalFunction' shown in FIG. 19. Function 'WrongFunction' without using implicit parameters is interpreted as shown in FIG. 21.

In nested subroutine environments, when prefix form of Grace~ operator is applied to the first parameter of subroutine (method) parameter list, the parameter will be moved into list of parameters of larger (more global) subroutine visibility scope.

To create function 'GlobalFunction' by using implicit parameters, parameter 'x' should be moved into higher visibility scope, which is visibility scope of function named 'GlobalFunction'. If the prefix form of Grace~ operator is applied to parameter x (which is the first parameter in the list of method parameters) one time, then parameter x is moved into higher visibility scope function, where it is placed as last parameter in the list of method parameters (if such higher visibility scope function exists). Function 'GlobalFunction' can be implemented by using implicit parameters and operator Grace~ as shown in FIG. 22.

If some parameter is moved into the list of method parameters with higher visibility scope function and if there is no higher visibility scope function, then such higher visibility scope function is created automatically and it is used as parent visibility scope to inner function. This effect is demonstrated in the example shown in FIG. 23.

But Grace~ operator is not supposed to move parameters from local scope function to more global scope function, if the local function is named function. Grace~ operator is designed to change parameter scope only if inner function is lambda expression. The result of such restriction is inability to define the function by using implicit parameters without redundant (unnecessary) code parts as shown in FIG. 18.

However, the positive side of this restriction is that it raises the code editability factor. Nested functions can always be moved into more global scope and moved function code will continue to compile. Besides, when using nested named functions, if result of outer function should be function, then nested function can be replaced with anonymous function this way permitting usage of Grace~ operator to change parameter scope of nested function parameters. If the result of outer function is data type instead of function, then parameters from inner function can be placed into outer function using implicit arguments which happens during inner function calls without providing explicit argument values [1].

Trying to move inner parameter into more global scope function too many times may lead to creation of some unnecessary (redundant) function scopes to wrap inner functions. The function 'TooMuchParamMovement' shown in FIG. 24 demonstrates this effect. Function 'TooMuchParamMovement' can be rewritten without using implicit parameters as shown in FIG. 25.

Redundant scope is the scope not containing parameters in subroutine parameters list with a body consisting of return statement returning lambda expression only. The compiler should detect redundant scopes and should remove them. The example of function 'TooMuchParamMovement' shown in FIG. 25 can be optimized by removing redundant scope and resulting effect is demonstrated in FIG. 26.

Figure 27:
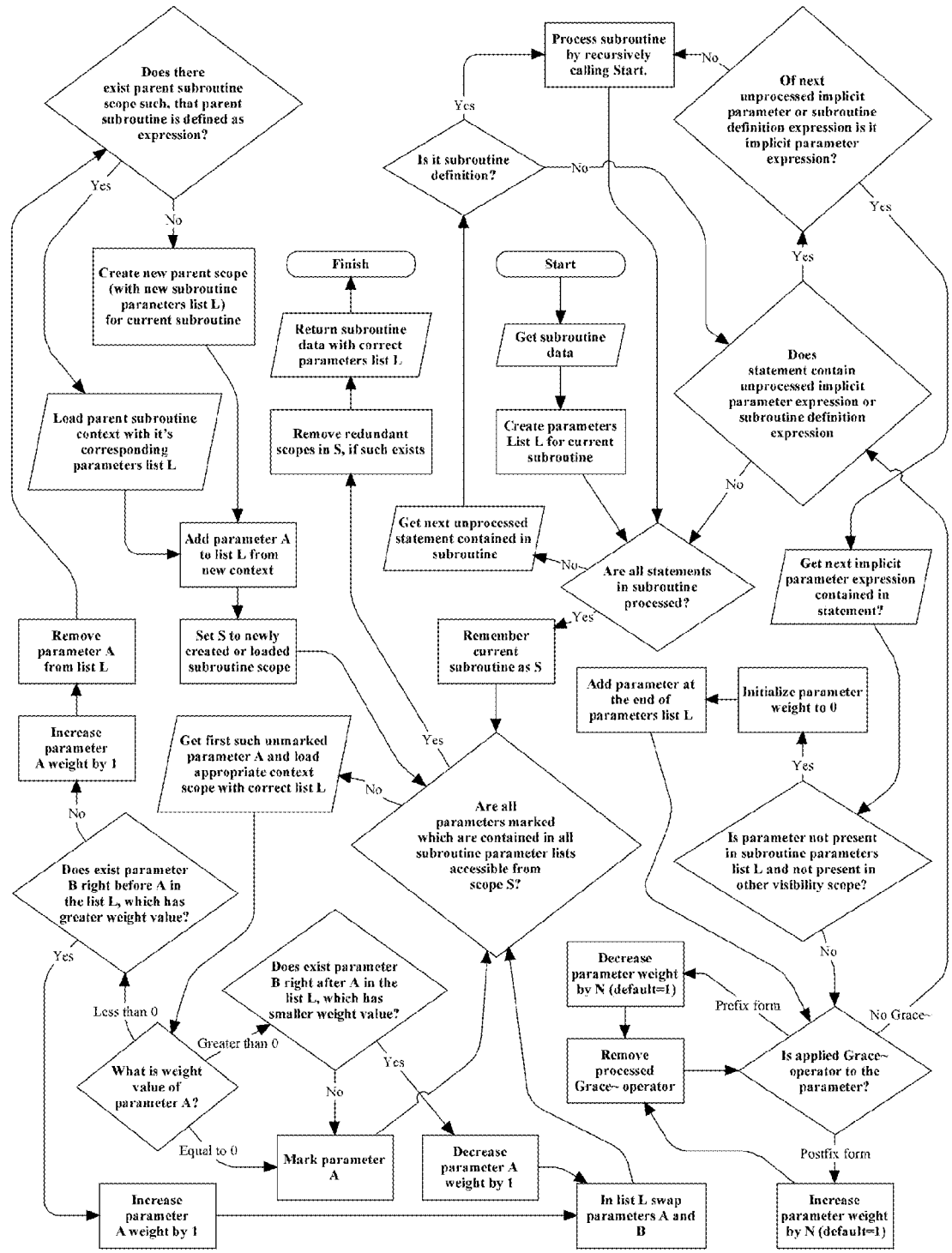
FIG. 27. show flowchart diagram demonstrating the logics of Grace operator in nested subroutine environments.

Diagram demonstrating the logics of Grace∞ operator in nested subroutine environments is shown in FIG. 27. Programming language parser should contain this logic to parse subroutines with implicit parameters in nested subroutine environments correctly.

Explicit parameters can be interpreted as formal contract part of subroutines but implicit parameters can be interpreted as more informal contract part. In cases, when subroutines are used (called) in many places in the code, informal contract is bad option, because any changes in subroutine parameter order would lead to errors in all subroutine calling code. But lambda expression by definition is subroutine declaration in place of its calling and that means: lambda expression cannot be directly called from another place in the code. This makes lambda expressions perfect case for using implicit parameters together with Grace~ operator.

The invention claimed is:

1. A method executed by a processor for reordering subroutine parameters in subroutine parameters list, where:
   the method is based on a prefix, single operand operator form named 'Grace~' in natural language;
   the 'Grace~' operator moves the parameter, to which the operator is applied, one position towards a first position in the subroutine parameters list;
   and after reaching the first position in the subroutine parameters list, further application of the 'Grace~' operator to the parameter is ignored and the parameter stays at the first position in the subroutine parameters list.

2. The method of claim 1 wherein the 'Grace~' operator accepts additional parameter N, which determines number of single movements, and priority of 'Grace~' operator is higher than priority of any operator used to define algorithm in the body of the subroutine.

3. A method executed by a processor for reordering subroutine parameters in a subroutine parameters list, where:
   the method is based on a postfix, single operand operator form named 'Grace~' in natural language;
   the 'Grace~' operator moves the parameter, to which the operator is applied, one position towards a last position in the subroutine parameters list;
   after reaching the last position in the subroutine parameters list, further application of the 'Grace~' operator to the parameter is ignored and the parameter stays at the last position in the subroutine parameters list.

4. The method of claim 3 wherein the 'Grace~' operator accepts additional parameter N, which determines number of single movements, and priority of 'Grace~' operator is higher than priority of any operator used to define algorithm in the body of the subroutine.

5. The method of claim 1, 2, 3 or 4, wherein resulting effect is determined by summing up all 'Grace~' operator prefix and postfix forms in the way, that one single prefix movement neutralizes one single postfix movement and only the parameter movement in subroutine parameters list is performed according to claims 1, 2, 3 or 4.

6. A method executed by a processor for reordering subroutine parameters in subroutine parameters list, where:
   the method is based on a prefix, single operand operator form named 'Grace~' in natural language;
   the 'Grace~' operator moves the parameter, to which the operator is applied, one position towards a first position in the subroutine parameters list;
   moving subroutine parameter outside the subroutine parameters list to one position before the first position in the subroutine parameters list, leads to parameter removal from the existing subroutine parameters list and adding it to higher visibility scope in the subroutine parameters list;
   if higher visibility scope subroutine does not exist, then such higher visibility subroutine context is created automatically;
   redundant subroutine scopes are removed.

7. The method of claim 6 wherein the 'Grace~' operator accepts the additional parameter N, which determines number of single movements, and priority of 'Grace~' operator is higher than priority of any operator used to define algorithm in the body of the subroutine.

8. The method of claim 6, 7, 3 or 4, wherein resulting effect is determined by summing up all 'Grace~' operator prefix and postfix forms in the way, that one single prefix movement neutralizes one single postfix movement and only the parameter movement in the list of subroutine parameters is performed according to claims 6, 7, 3 or 4.

* * * * *